United States Patent [19]

Hyosu

[11] Patent Number: 4,601,968

[45] Date of Patent: Jul. 22, 1986

[54] PROCESS FOR PRODUCING TONER FOR DEVELOPMENT OF ELECTROSTATIC IMAGES BY STEPWISE SUSPENSION POLYMERIZATIONS

[75] Inventor: Yoshihiko Hyosu, Sagamihara, Japan

[73] Assignee: Canon Kabushiki Kaisha, Tokyo, Japan

[21] Appl. No.: 536,333

[22] Filed: Sep. 27, 1983

[30] Foreign Application Priority Data

Oct. 4, 1982 [JP] Japan ................................ 57-174218
Oct. 4, 1982 [JP] Japan ................................ 57-174219

[51] Int. Cl.$^4$ ............................................. G03G 9/08
[52] U.S. Cl. ................................ 430/137; 430/106.6; 430/110
[58] Field of Search .................. 430/137, 106.6, 110; 428/407, 404

[56] References Cited

U.S. PATENT DOCUMENTS

| | | | |
|---|---|---|---|
| 3,959,153 | 5/1976 | Sadamatsu et al. | 430/137 |
| 4,077,804 | 3/1978 | Vanzo | 427/214 |
| 4,430,409 | 2/1984 | Matsumoto et al. | 428/407 |
| 4,459,378 | 7/1984 | Ugelstad | 523/205 |

FOREIGN PATENT DOCUMENTS

| | | | |
|---|---|---|---|
| 1435821 | 5/1976 | United Kingdom | 428/407 |
| 1538787 | 1/1979 | United Kingdom . | |
| 1583564 | 1/1981 | United Kingdom . | |

*Primary Examiner*—John L. Goodrow
*Attorney, Agent, or Firm*—Fitzpatrick, Cella, Harper & Scinto

[57] ABSTRACT

A polymerizable mixture containing a monomer, a polymerization initiator and a colorant is subjected to suspension polymerization, and an additional monomer is adsorbed onto the resultant polymer particles and grown by polymerization to give a toner for development of electrostatic charges excellent in toner characteristics such as triboelectric charging characteristic, storage stability and free flowing property.

11 Claims, No Drawings

PROCESS FOR PRODUCING TONER FOR DEVELOPMENT OF ELECTROSTATIC IMAGES BY STEPWISE SUSPENSION POLYMERIZATIONS

BACKGROUND OF THE INVENTION

1. Field of the Invention

This invention relates to a process for producing a toner for developing electrostatically charged images.

2. Description of the Prior Art

Conventionally, toners for development of electrostatic charges have been manufactured generally by fusion-mixing colorants into thermoplastic resins to be dispersed uniformly therein, followed by pulverization and classification into desired particle sizes by means of a micropulverizer and a classifier. This preparation method is capable of producing considerably excellent toners but limited in certain respects, namely in the scope of choice of the materials for toner. For example, the resin with pigment dispersed therein is required to be sufficiently fragile so as to be micropulverized at an economically feasible production rate. From such a requirement, there is also posed a problem that the pigment-resin dispersion is so fragile that particles with a wide particle size distribution are formed and, especially, a large proportion of minute particles are contained therein, when micropulverization is actually effected at a high rate. However, such a highly fragile material will also frequently suffer from further micropulverization or powder formation during use for development in a copying machine. Other requirements for a toner are to be stable during storage, to be free from agglomeration, to have triboelectric charging characteristic suitable for development, to be capable of forming excellent images, to result in no coverage or contamination of a photosensitive member and further to have a low melting point suitable for thermal fusion. These requirements must be satisfied together with the additional conditions imposed on the toner formation method.

In order to remove the drawbacks of the pulverization method as described above, Japanese Laid-open Patent Publication No. 17735/1978 and others propose to produce toners according to the emulsion or suspension polymerization method. These methods will directly provide toners by dispersing a composition comprising a monomer, a polymerization initiator, a colorant, a magnetic material and others in water. According to these methods, since no pulverization step is included, no fragility for the material is necessary, and a toner is obtained in a spherical shape and is thus excellent in free flowing property. It is also possible to obtain a toner excellent in heat fixing characteristic by controlling polymerization adequately or bu use of a crosslinking agent. However, according to emulsion or suspension polymerization, a large amount of a dispersant such as a water-soluble polymeric material or sparingly soluble inorganic material is required to be used and, even when acid treatment or washing with water is conducted for removal of such a material, there will remain a small quantity of the dispersant on the toner surface. As the result, due to the moisture (humidity) in the air, it will exert an influence on the electroconductivity of the toner thereby to make the triboelectric charging characteristic of the toner markedly unstable. In addition, according to these methods, a magnetic material or a colorant is caused to be present ununiformly on the toner particle surface, whereby the triboelectric charging characteristic is also rendered unstable to give no clear copied image.

SUMMARY OF THE INVENTION

A principal object of the present invention is to remove the drawbacks of the conventional process for producing a toner according to suspension polymerization and provide a process for producing a toner which is not only excellent in free flowing property but also excellent in triboelectric charging characteristic.

Another object of the present invention is to provide a process for producing a toner which is endowed with both good fixing characteristic and good storage stability such as antiblocking property, etc.

The process for producing a toner of the present invention comprises the steps of:

a. dispersing a polymerizable mixture comprising a polymerizable monomer, a polymerization initiator and a colorant in a dispersion medium in which the polymerizable monomer is substantially insoluble;

b. polymerizing the dispersion of the polymerizable mixture in the dispersion medium;

c. adding an additional polymerizable monomer into the disperse system containing the polymeric particles formed to have the monomer adsorbed on the polymeric particles; and d. polymerizing the additional polymerizable monomer.

DETAILED DESCRIPTION OF THE INVENTION

The present invention is to be described in further detail hereinbelow. In the following description, "%" and "parts" representing quantities are based on weight, unless otherwise specifically noted.

For production of the toner according to the present invention, polymeric particles as seed or core are first prepared by suspension polymerization. For this purpose, a polymerizable mixture comprising a polymerizable (ethylenically unsaturated) monomer, a polymerization initiator, a colorant and an additive, etc. homogeneously dissolved or dispersed with each other may be dispersed in a dispersion medium to carry out suspension polymerization.

As specific examples of the polymerizable monomer, the monomers as mentioned below are applicable for the present invention. $\alpha,\beta$-Unsaturated monomers may include, for example, styrene and its derivatives such as styrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene, and 3,4-dichlorostyrene. Among them, styrene monomer is most preferred. Other vinyl monomers may encompass, for example, ethylenically unsaturated monoolefins such as ethylene, propylene, butylene, and isobutylene; vinyl halides such as vinyl chloride, vinylidene chloride, vinyl bromide, and vinyl fluoride; vinyl esters such as vinyl acetate, vinyl propionate, vinyl benzoate, and vinyl butyrate; o-methylene aliphatic monocarboxylic acid esters such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, phenyl acrylate, methyl $\alpha$-chloroacrylate, methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, and diethylaminoethyl methacrylate; acrylic acid or methacrylic acid derivatives such as acrylonitrile, methacrylonitrile, and acrylamide; vinyl ethers such as vinyl methyl ether, vinyl ethyl ether, and vinyl isobutyl ether; vinyl ketones such as vinyl methyl ketone, vinyl hexyl ketone, and methyl isopropenyl ketone; N-vinyl compounds such as N-vinyl pyrrole, N-vinyl carbazole, N-vinyl indole, and N-vinyl pyrrolidone; vinyl naphthalenes; and so on.

It is also possible for a crosslinking agent to be present in the monomer during polymerization so as to provide a seed polymer in the form of a crosslinked polymer. Crosslinking agents preferably used are primarily compounds having two or more polymerizable double bonds, as exemplified by aromatic divinyl compounds such as divinylbenzene, divinylnaphthylene and their derivatives; diethylenic carboxylic acid esters such as ethylene glycol dimethacrylate, diethylene glycol methacrylate, triethylene glycol methacrylate, trimethlolpropane triacrylate, allyl methacrylate, t-butylaminoethyl methacrylate, tetraethylene glycol dimethacrylate, 1,3-butanediol methacrylate, etc.; all divinyl compounds such as N,N-divinyl aniline, divinyl ether, divinyl sulfide, divinyl sulfone, etc.; and compounds having 3 or more vinyl groups. These compounds may be chosen singly or as a mixture. Further, still other useful crosslinking agents in the present invention are inclusive of dihydric alcohols such as ethylene glycol, triethylene glycol, 1,2-propylene glycol, 1,3-propylene glycol, 1,4-butanediol, neopentyl glycol, 1,4-butenediol, 1,4-bis-(hydroxymethyl)cyclohexane, bisphenol A, hydrogenated bisphenol A, polyoxyethylenated bisphenol A, polyoxypropylenated bisphenol A, etc.; dibasic acids and derivatives thereof such as maleic acid, fumaric acid, mesaconic acid, citraconic acid, itaconic acid, glutaconic acid, phthalic acid, isophthalic acid, terephthalic acid, cyclohexane dicarboxylic acid, succinic acid, adipic acid, sebacic acid, malonic acid, anhydrides thereof or esters thereof with lower alcohols; trihydric or higher alcohols such as glycerine, trimethylolpropane, pentaerythritol, etc.; tribasic or more carboxylic acids such as trimellitic acid, pyromellitic acid, etc.

Such a crosslinking agent may be added to the monomer in an amount ranging from 0.005 to 20%, preferably 0.1 to 5%. If the amount added is too much, the resultant polymer may become infusible, whereby fixing characteristic as toner is liable to be lost. On the other hand, at a level which is too low, it is difficult to impart characteristics of toner such as durability, storability, abrasion resistance, etc. to the toner, and, particularly in a copying machine of the hot roll fixing system, for example, it is difficult to exhibit the effect of preventing off-set phenomenon during fixing through expansion of the molecular weight distribution of the polymer by crosslinking and the resultant properties of the toner per se.

As the colorant, any one selected from pigments, dyes and the like may be employed. For example, carbon black, nigrosine dyes, oil black and others may be used singly or as a mixture. Magnetic materials as hereinafter described may also be used as a colorant.

In order to make the toner obtained according to the present invention in the form of a magnetic toner, powder of a magnetic material may also be incorporated in the polymerizable mixture. The magnetic material may be any substance which can be strongly magnetized by a magnetic field in the direction of the magnetic field. Preferably, magnetite may be employed. Representative magnetic materials may include metals such as cobalt, iron and nickel; alloys of metals such as aluminum, cobalt, steel, iron, lead, magnesium, nickel, tin, zinc, antimony, beryllium, bismuth, cadmium, calcium, manganese, selenium, titanium, tungsten, vanadium, and mixtures of such alloys; metal oxides such as aluminum oxide, iron oxide, copper oxide, nickel oxide, zinc oxide, titanium oxide and magnesium oxide; refractory nitrides such as vanadium nitride and chromium nitride; carbides such as tungsten carbide; ferrites and mixtures thereof.

The magnetic material may be used in an amount of 10 to 100 parts per 100 parts of the above monomer.

In the polymerizable mixture, for the purpose of controlling the fixability of the resultant toner, it is also possible to incorporate a wax such as polyethylene wax, paraffin wax, fatty acid metal salt, etc.

A polymerization initiator is admixed with the respective components as described above to give a polymerizable mixture. As the polymerization initiator, a suitable polymerization initiator may be selected from, for example, azobisisobutyronitrile (AIBN), benzoyl peroxide, methyl ethyl ketone peroxide, isopropyl peroxycarbonate, cumene hydroperoxide, 2,4-dichlorobenzoyl peroxide, lauroyl peroxide, and the like, so as to carry out polymerization of the monomer. Generally speaking, it is sufficient if the initiator is employed in an amount of about 0.5 to 5% of the monomer weight.

The polymerizable mixture containing the abovementioned respective components is dispersed in a dispersion medium substantially insoluble with the monomer contained therein, preferably an aqueous dispersion medium. Suitable dispersion media are aqueous ones containing appropriate dispersants, as exemplified by polyvinyl alcohol, gelatin, methyl cellulose, methylhydropropyl cellulose, ethyl cellulose, sodium salt of carboxymethyl cellulose, polyacrylic acid and salts thereof, starch, gum, alginic acid salt, zein, casein, tricalcium phosphate, talc, barium sulfate, bentonite, aluminum hydroxide, ferric hydroxide, titanium hydroxide, thorium hydroxide and so on. Such a dispersant may be employed in an amount sufficient for stabilizing the dispersion of the polymerizable mixture in the continuous phase, preferably from 0.1 to 10% of the polymerizable mixture.

It is also desirable to employ a surfactant in an amount ranging from 0.001 to 0.1% of the polymerizable mixture in combination for the purpose of finely dispersing the inorganic dispersant as mentioned above. This is added to promote the desired action of the above dispersant, and specific examples thereof may include sodium dodecylbenzenesulfonate, sodium tetradecylsulfate, sodium pentadecylsulfate, sodium octylsulfate, sodium allyl-alkyl-polyethersulfonate, sodium oleate, sodium laurate, sodium caprate, sodium caprylate, sodium caproate, potassium stearate, calcium oleate, sodium 3,3'-disulfondiphenylurea-4,4'-diazo-bis-amino-8-naphthol-6-sulfonate, o-carboxybenzeneazo-dimethylaniline, sodium 2,2',5,5'-tetramethyltriphenylmethane-4,4'-diazo-bis-$\beta$-naphthol-disulfonate and others.

A monomer relatively soluble in water can simultaneously cause emulsion polymerization in water to contaminate the resultant product of the suspension polymerization with minute emulsion-polymerized particles, and therefore such an emulsion polymerization in aqueous phase should preferably be prevented by addition of a water solubilization inhibitor such as a metal salt. It is also effective to add glycerine, glycol, etc. into water for the purpose of preventing coalescence of the particles through increase of the viscosity of the medium. Also, in order to reduce the solubility of a relatively soluble monomer in water, it is also possible to use a salt such as NaCl, KCl, Na$_2$SO$_4$, etc.

In such a dispersion medium, the above-mentioned polymerizable mixture is dispersed by means of a high shearing force stirrer such as homo-mixer or homogenizer. Preferably, stirring speed and time should be controlled so that the droplets of the polymerizable mixture may have sizes of 4 to 27μ, which are somewhat smaller than the desired toner particle sizes, and after initiation of polymerization, stirring may be conducted to such an extent that sedimentation of the particles may be prevented so as to maintain substantially the above-mentioned state through the action of a dispersion stabilizer. The polymerization temperature may be generally 50° C. or higher, usually 50° C. to 120° C., but it is preferred to carry out polymerization by setting the temperature at 70° C. to 90° C., since polymerization can be effected more uniformly as the temperature is lower.

As the next step, into the disperse system containing the seed polymer particles as obtained above, under appropriate stirring, an additional monomer of the same kind as or different from the one which gave the seed polymer particles is injected with careful control to have the monomer adsorbed on the seed polymer particles. For the purpose of obtaining the best result in this operation, it is important to carefully control the rate of addition of the monomer. If the rate of addition is too small, polymerization time will be unduly prolonged. On the other hand, if the rate of addition is too large, not only a large amount of minute particles will be formed, but also seed particles tend to coalesce with each other to form agglomerates. Generally speaking, the monomer should be added at a rate which is substantially the same as or lower than the rate of adsorption of the monomer. The surfaces of the polymer particles as the seeds adsorb the monomer and are swelled therewith. When such swelling occurs only at the surfaces, the polymer particles are consequently coated with the monomer, which is then polymerized with an initiator to give smooth surfaces which are not contaminated with a colorant or a magnetic material or small in contamination. Also, by controlling the amount of the monomer relative to the polymer particles as seeds, the resultant polymer particles can be controlled to have desired particle sizes i.e., a weight average particle size in the range of from 5 to 30μ.

The additional monomer can be chosen suitably from the group of monomers as exemplified above for the formation of the above-mentioned seed polymer. It is also possible to incorporate a crosslinking agent similarly as in the formation of the seed polymer as described above. The amount of the additional monomer may preferably 5 to 100 parts, particularly 10 to 80 parts, per 100 parts of the polymerizable mixture affording the seed polymer.

After or along with addition of the additional monomer, polymerization (growth polymerization) of the additional monomer adsorbed on the seed polymer is carried out.

Either oil-soluble or water-soluble polymerization initiator may be available for the growth polymerization. The polymerization initiator employed may be a typical free radical initiator or redox catalyst. Illustrative of free-radical initiators are hydrogen peroxide, peracetic acid, t-butyl hydroperoxide, di-tert-butyl peroxide, dibenzoyl peroxide, perbenzoic acid, tert-butyl peracetate, azobisisobutyronitrile, ammonium persulfate, sodium persulfate, potassium persulfate, potassium perphosphate, etc. Illustrative of redox catalyst systems are sodium persulfate-sodium formaldehyde sulfoxylate, cumene hydroperoxide-sodium metabisulfite, hydrogen peroxide-ascorbic acid and so on. The initiator concentration may be generally in the range of from 0.3 to 8% based on the additional monomer.

In the growth polymerization, it is possible to use a surfactant for stabilization of the polymer particles. For example, as anionic surfactants, there are potassium palmitate, potassium stearate, potassium caprate, potassium oleate, sodium dodecylsulfonate, sodium laurate, sodium rosinate, alkylsodium sulfosuccinic acid ester, etc. As cationic surfactants, there are long-chain quaternary amine salts and others. As nonionic surfactants, there are ethylene oxide condensates of linoleic acid, lauric acid, ricinoleic acid and caproic acid, ethylene oxide condensates of oleyl alcohol, cetyl alcohol, lauryl alcohol, etc. These surfactants may be used either singly or in combination. The concentration of a surfactant may be favorably at the critical micell concentration (CMC) or lower, but an amount in excess of CMC may be added for the purpose of increasing the emulsion particle sizes or stabilization of particles. It is also possible to employ the method in which generation of new particles is suppressed by prevention of emulsion polymerization in the aqueous phase by use of a polymerization inhibitor such as NH$_4$SCM (ammonium thiocyanate) or a copper salt.

The polymer given by the additional monomer (grown polymer) should desirably have a Tg (glass transition point) higher than that of the polymer in the seed polymer particles (seed polymer). This is because a toner can be obtained, which is provided with fixing characteristic and storage stability such as antiblocking property, etc. in combination. Generally speaking, the grown polymer may preferably have a Tg of 70° C. or higher and the seed polymer a Tg of less than 80° C. More specifically, the Tg of the grown polymer should be in the range of from 70° to 150° C., and the Tg of the seed polymer from 20° to 70° C., the difference between both Tg's being preferably from 35° to 85° C. Such a difference in Tg can be given by the difference in the monomer species affording the grown polymer and the seed polymer and the difference in amount of the crosslinking agents contained in these polymers, but it can be controlled to some extent by the polymerization temperature and the catalyst employed.

Generally speaking, when the grown polymer or the seed polymer is a copolymer of two or more kinds of monomers or a mixture of two or more kinds of polymers, its Tg may be calculated approximately from the respective Tg's of its component polymers (or homopolymers of the component monomers), i.e. $Tg_1$, $Tg_2$, ..., their volume ratios $V_1$, $V_2$, ... and their weight ratios $W_1$, $W_2$, ... according to either one of the following equations:

$$T_g = V_1 T_{g1} + V_2 T_{g2} + \ldots, \text{ or}$$

-continued $$\frac{1}{T_g} = \frac{W_1}{T_{g1}} + \frac{W_2}{T_{g2}} + \ldots$$

After the growth polymerization as described above, the polymer particles obtained are recovered by treatment according to a suitable combination of washing, filtration, decantation, centrifugation and drying to provide toner particles according to this invention.

The toner obtained may be applicable for all of the electrostatic charge developing methods known in the art. For example, there may be employed two-component developing methods such as the cascade method, the magnetic brush method and the microtoning method; one component developing methods such as the electroconductive one component developing method, the insulating one component developing method and the jumping developing method; the powder cloud method and the fur brush method; the non-magnetic one component method in which the toner is travelled to the developing section by being held on a toner carrier through electrostatic force to be developed thereat.

The present invention is illustrated below by referring to the Examples constituting the preferred embodiments of the present invention.

EXAMPLE 1

400 Grams of styrene, 240 g of magnetite (EPT-1000, mfd. by Toda Kogyo K.K.) having a particle size in terms of BET specific surface area of 6.0 m²/g, 24 g of an oxidized petrolatum metal salt (OX-0851, produced by Nippon Seiro K.K.) and 8 g of acetylsalicylic acid chromium complex were mixed homogeneously in a vessel equipped with a high shearing force mixer (TK-homomixer produced by Tokushu Kogyo Co.) for 20 minutes. During this operation, the temperature became elevated to about 50° C. By this time, the above magnetite was dispersed in the styrene monomer. 30 Grams of lauroyl peroxide was added into the above magnetite-containing styrene monomer under stirring. An aqueous solution of 9.0 g of polyvinyl alcohol dissolved in 600 g of water was maintained at 70° C. and charged into the above slurry under stirring by means of a homomixer, followed by stirring at 4000 rpm for 30 minutes. This reaction mixture system was stirred by means of a paddle stirring blade to complete polymerization.

Then, 100 g of styrene with 1 g of benzoyl peroxide dissolved therein was added dropwise over 2 hours, and polymerization was carried out at 80° C. for 3 hours.

The resultant polymer was washed with water, filtered and dried to obtain a toner with a number average size of 10.1μ, 15% by number of 6.35μ or smaller and 1% by volume of 20.2μ or larger (by use of Coulter Counter with 100μ aperture). The toner was observed by a scanning type electron microscope and found to have a smooth surface. Image formation was effected by use of this toner by a commercially available dry system electrophotographic copying machine (NP-400 RE. mfd. by Canon K.K.) As the result, clear images without fog could be obtained. The image density obtained at the solid black portion was 1.20 as measured by a reflection densitometer. Further, the toner characteristics were also found to be satisfactory, particularly excellent in free flowing property and durability in continuous image formation.

EXAMPLE 2

80 Grams of styrene, 20 g of n-butyl methacrylate, 0.2 g of trimethylolpropane triacrylate, 10 g of β-type phthalocyanine pigment and 2 g of acetylsalicylic acid chromium complex were mixed and dispersed homogeneously in a ball mill. Then, 3 g of 2,2'-azobis-(2,4-dimethylvaleronitrile) was added to the mixture to be dissolved therein. The above slurry was thrown into an aqueous phase of 300 g of water containing 3 g of tricalcium phosphate and 0.05 g of sodium dodecylbenzenesulfonate under stirring by TK-homomixer at a stirring speed of 5000 rpm. Then, polymerization was carried out at 60° C. for 7 hours and completed. As the next step, the temperature of the mixture was elevated to 70° C. and 50 g of styrene with 2 g of 2,2'-azobisisobutyronitrile dissolved therein was added dropwise over 4 hours, followed by polymerization at the same temperature for 5 hours to complete the polymerization. After cooling, the mixture was dried for 3 minutes to obtain a toner with a number average size of 9.2μ (by use of Coulter Counter with aperture of 100μ).

By use of this toner, image formation was effected by a commercially available electrophotographic copying machine (NP-5000, mfd. by Canon K.K.). As the result, clear images without fog were obtained.

EXAMPLE 3

320 Grams of styrene, 80 g of ethyl acrylate, 240 g of magnetite (EPT-1000) having a Fischer size of 0.4μ and a particle size in terms of a BET specific surface area of 6.0 m²/g, 24 g of an oxidized petrolactum metal salt (OX-0851, produced by Nippon Seiro K.K.) and 8 g of acetylsalicylic acid chromium complex were mixed homogeneously in a vessel equipped with a high shearing force mixer (TK-homomixer produced by Tokushu Kogyo K.K.) for 20 minutes. During this operation, the temperature became elevated to about 50° C. By this time, the above magnetite was dispersed in styrene monomer. 30 Grams of lauroyl peroxide was added under stirring into the above magnetite-containing styrene monomer. An aqueous solution of 9.0 g of polyvinyl alcohol dissolved in 600 g of water was maintained at 70° C. and thrown into the above slurry under stirring by means of a homomixer, followed by stirring at 4000 rpm for 30 minutes. This reaction mixture was stirred by means of a paddle stirring blade to complete polymerization. The resultant seed polymer particles exhibited a glass transition temperature of 67° C. as measured by a differential thermal analyzer.

Then, 100 g of styrene containing 1 g of benzoyl peroxide dissolved therein (capable of giving a polystyrene having a glass transition temperature of 100° C. under corresponding polymerization conditions) was added dropwise over 2 hours, and polymerization was carried out at 80° C. for 3 hours and completed.

The resultant polymer was washed with water, filtered and dried to obtain a toner with a number average size of 10.1μ, 15% by number of 6.35μ or smaller and 1% by volume of 20.2μ or larger (by use of Coulter Counter with 100μ aperture). The toner was observed by a scanning type electron microscope and found to have a smooth surface.

Image formation was effected by use of this toner by a commercially available dry system electrophotographic copying machine (NP-400 RE). As the result, clear images without fog could be obtained. The image density obtained at the solid black portion was 1.20 as measured by the reflection densitometer. Further, the toner characteristics were also found to be satisfactory, particularly excellent in free flowing property and durability in continuous image formation.

EXAMPLE 4

80 Grams of styrene, 20 g of n-butyl methacrylate, 0.2 g of trimethylolpropane triacrylate, 10 g of β-type phthalocyanine pigment and 2 g of acetylsalicylic acid chromium complex were mixed and dispersed homogeneously in a ball mill. Then, 3 g of 2,2'-azobis-(2,4-dimethylvaleronitrile) was added to the mixture and dissolved therein. The above slurry was thrown into an aqueous phase of 300 g of water containing 3 g of tricalcium phosphate and 0.05 g,of sodium dodecylbenzenesulfonate under stirring by TK-homomixer at a stirring speed of 5000 rpm. Then, polymerization was carried out at 60° C. for 7 hours and completed. The resultant polymer particles were found to exhibit a glass transition temperature of 55° C. As the next step, the mixture was elevated to 70° C. and 50 g of styrene having 2 g of 2,2'-azobisisobutyronitrile dissolved therein (capable of giving a polystyrene having a glass transition temperature of 100° C. under the corresponding conditions) was added dropwise over 4 hours, followed by polymerization at the same temperature for 5 hours to complete polymerization. After cooling, the mixture was filtered and dried for 3 minutes to obtain a toner with a number average size of 9.2μ (by use of Coulter Counter with aperture of 100μ).

By use of this toner, image formation was effected by a commercially available electrophotographic copying machine (NP-5000). As the result, clear images without fog were obtained.

What is claimed is:

1. A process for producing a toner for developing electrostatically charged images, which comprises the steps of:
   a. dispersing a polymerizable mixture comprising a polymerizable monomer, a polymerization initiator and a colorant in a dispersion medium in which the polymerizable monomer is substantially insoluble, under sufficient high shearing force as to produce dispersion droplets of the polymerizable mixture in sizes of 4 to 27μ wherein up to about 0.1 wt. % of surfactant based on the polymerizable mixture is present to promote the dispersion medium;
   b. polymerizing the dispersion of the polymerizable mixture in the dispersion medium to produce polymer particles in a weight average particle size in the range from 4 to 27μ;
   c. adding 5 to 100 parts by weight of an additional polymerizable monomer per 100 parts by weight of the polymerizable monomer in step a. and an oil-soluble polymerization initiator dissolved in the additional polymerizable monomer into the disperse system containing the polymeric particles formed, to have the monomer adsorbed on the polymeric particles; and
   d. polymerizing the additional polymerizable monomer thereby to obtain polymer particles as a toner having a weight average particle size in the range of from 5 to 30μ.

2. A process according to claim 1, wherein the additional monomer and the conditions for the step d are selected so that the polymer obtained in the step d will have a glass transition temperature higher than that of the polymer obtained in the step b.

3. A process according to claim 2, wherein the polymer obtained in the step d has a glass transition temperature higher by 35° C. or more than that of the polymer obtained in the step b.

4. A process according to claim 1, wherein the additional monomer in the step c is added at a rate equal to or lower than the adsorption rate at which said additional monomer is adsorbed onto the polymer particles, whereby the formation of free liquid droplets of said additional monomer is prevented.

5. A process according to claim 1, wherein the dispersion medium comprises water.

6. A process according to claim 5, wherein the dispersion medium further contains a dispersant.

7. A process according to claim 6, wherein the dispersant comprises a combination of an inorganic dispersing agent and a surfactant, wherein the surfactant is employed in amounts from 0.001 to 0.1 weight percent based on the polymerizable mixture.

8. A process according to claim 1, wherein the polymerizable monomer in the step a contains a crosslinking agent.

9. A process according to claim 1, wherein the additional monomer in the step c contains a crosslinking agent.

10. A process according to claim 1, wherein said polymerizable mixture contains a magnetic material.

11. A process according to claim 1, wherein the disperse system formed in step a is substantially free of surfactant.

* * * * *

UNITED STATES PATENT AND TRADEMARK OFFICE
CERTIFICATE OF CORRECTION

PATENT NO. : 4,601,968
DATED : July 22, 1986
INVENTOR(S) : YOSHIHIKO HYOSU

It is certified that error appears in the above-identified patent and that said Letters Patent is hereby corrected as shown below:

COLUMN 1

Line 58, change "sparlingly" to --less--.

COLUMN 2

Line 63, change "o-methylene" to --$\alpha$-methylene--.

COLUMN 8

Line 32, change "petrolactum" to --petrolatum--.

COLUMN 9

Line 15, change "g,of" to --g of--.

COLUMN 10

Line 5, change "step a." to --step a--.

Signed and Sealed this

Twenty-first Day of April, 1987

Attest:

DONALD J. QUIGG

Attesting Officer     Commissioner of Patents and Trademarks